United States Patent
Higashimura et al.

(10) Patent No.: US 6,494,547 B2
(45) Date of Patent: Dec. 17, 2002

(54) BRAKE SYSTEM FOR ELECTRIC MOTOR-POWERED VEHICLE

(75) Inventors: Hideaki Higashimura, Itami (JP); Koichi Hashida, Itami (JP)

(73) Assignee: Sunitomo (SEI) Brake Systems, Inc., Hisai (JP)

(*) Notice: Subject to any disclaimer, the term of this patent is extended or adjusted under 35 U.S.C. 154(b) by 0 days.

(21) Appl. No.: 09/861,563

(22) Filed: May 22, 2001

(65) Prior Publication Data

US 2002/0011750 A1 Jan. 31, 2002

(30) Foreign Application Priority Data

Jun. 26, 2000 (JP) .......................... 2000-190879

(51) Int. Cl.[7] .............. B60T 8/00; B60T 8/38; B60K 6/02; B60L 7/24
(52) U.S. Cl. ............ 303/152; 188/156; 303/3; 303/115.1; 303/116.1
(58) Field of Search ............. 303/2, 3, 20, 152, 303/116.1, 116.2, 116.4, 117.1, 13–15, 115.1–115.6, 186–189, 113.5, 113.3, 113.1, 900, 901; 188/156, 158, 106 P, 106 R, 181 T; 180/165; 701/22

(56) References Cited

U.S. PATENT DOCUMENTS 5,253,929 A * 10/1993 Ohori ........................ 303/3

FOREIGN PATENT DOCUMENTS

| JP | 5-176407 | 7/1993 |
| JP | 7-336806 | 12/1995 |
| JP | 11198786 | 7/1999 |

OTHER PUBLICATIONS

English Language Abstract of JP 11–198786.
English Language Abstract of JP 5–176407.
English Language Abstract of JP 7–336806.

* cited by examiner

Primary Examiner—Douglas C. Butler
(74) Attorney, Agent, or Firm—Greenblum & Bernstein, P.L.C.

(57) ABSTRACT

Improving operating feelings and energy saving are aimed for a brake system of the type in which a predetermined differential pressure is produced between a master cylinder and wheel cylinders by a hydraulic pressure limit/changeover device during regenerative braking, and at the end of regenerative braking, the differential pressure is cancelled by increasing the pressure in the wheel cylinders with fluid sucked up from a reservoir for pressure increase by an electric pump. A reservoir for pressure increase, which is also used as a stroke simulator, is provided on the master cylinder side of the hydraulic pressure limit/changeover device, an on-off valve and a check valve are provided parallel to each other on the inlet side of the reservoir for pressure increase.

20 Claims, 7 Drawing Sheets regenerative control from high speed regenerative control from low speed

BRAKE SYSTEM FOR ELECTRIC MOTOR-POWERED VEHICLE

BACKGROUND OF THE INVENTION

This invention relates to a brake system for an electric motor-powered vehicle which uses both regenerative braking and hydraulic braking, and more specifically a brake system in which brake operating feeling has been improved.

In electric cars and hybrid cars which also use an engine, regenerative braking is adopted in which the electric motor for driving wheels functions also as a generator during braking to generate braking force while collecting energy. But since the braking force obtained by regenerative braking is limited, hydraulic braking is also used.

With a brake system using both regenerative braking and hydraulic braking, it is proposed to maintain good brake feeling even during changeover from regenerative braking to hydraulic braking in Japanese patent publication 11-198786.

In the brake system of this publication, in order to eliminate solid or rigid pedal feeling as felt in the system of Japanese patent publication 7-336806, and sudden extension of the pedal stroke during changeover from regenerative braking to hydraulic braking as felt in the system of Japanese patent publication 5-176407, between the master cylinder and the wheel cylinders, a hydraulic pressure limit/changover means is provided in which a differential pressure valve, an on-off valve and a proportional pressure-reducing valve (or proportioning valve) are arranged in parallel, and on the downstream side (wheel cylinder side) of the hydraulic pressure limit/changeover means, a reservoir for pressure increase is provided to suck up brake fluid in the reservoir and supply it to the wheel cylinders when a pressure-increase command is issued from an electronic control unit.

In the brake system of Japanese patent publication 11-198786, the reservoir for pressure increase is used as a stroke simulator to eliminate solid or rigid pedal feeling. Also, it is possible to cancel a predetermined differential pressure produced between the master cylinder pressure (hydraulic pressure produced in the master cylinder) and the wheel cylinder pressure (hydraulic pressure in the wheel cylinders) during regenerative braking. Thus it is possible to also eliminate sudden extension of the brake pedal (which is felt when the master cylinder and the wheel cylinders are brought into communication with each other to change over from braking using both regenerative braking and hydraulic pressure to braking by hydraulic pressure only).

But since the reservoir for pressure increase is provided on the downstream side of the hydraulic pressure limit/changeover means as viewed from the master cylinder, it is necessary to keep the split point hydraulic pressure of the proportional pressure-reducing valve in the hydraulic pressure limit/changeover means above the actuation-start pressure of the reservoir for pressure increase, and increase the pressure-reducing ratio of the proportional pressure-reducing valve to take in fluid into the reservoir for pressure increase. Thus start of regenerative braking is delayed, and the braking force by hydraulic pressure in the initial period of start of regenerative braking tends to be larger than required.

Also, during braking, since inflow of fluid into the reservoir for pressure increase especially during sharp braking is limited by the upstream proportional pressure-reducing valve, solid pedal feeling is temporarily felt.

Further, when the brake pedal is returned during regenerative braking, brake fluid in the reservoir for pressure increase flows out through a check valve on the pump suction side, the pump and a check valve on the pump discharge side. Thus fluid may remain in the reservoir for pressure increase. In such a case, the brake pedal is not smoothly returned.

An object of this invention is to eliminate such disadvantages and improve energy saving and brake operating feeling.

SUMMARY OF THE INVENTION

According to this invention, there is provided a brake system for an electric vehicle which uses both regenerative braking in which braking force is applied to wheels by an electric motor for driving wheels, and hydraulic braking in which braking force is applied to the wheels by supplying hydraulic pressure of a master cylinder to wheel cylinders, and during the regenerative braking, a predetermined differential pressure is produced between the master cylinder and the wheel cylinders by lowering hydraulic pressure supplied from the master cylinder to the wheel cylinders by means of a hydraulic pressure limit/changeover means comprising a differential pressure valve, an on-off valve and a proportional pressure-reducing valve provided parallel to the differential pressure valve, and at the end of regenerative braking, the differential pressure being cancelled by sucking brake fluid from a reservoir for pressure increase, which serves also as a stroke simulator, by means of an electric pump and supplying it to the wheel cylinders in response to a pressure-increase command from an electronic control unit, characterized in that the reservoir for pressure increase communicates with a main flow passage at a point upstream of the hydraulic pressure limit/changeover means, and an on-off valve and a check valve for allowing only a fluid flow from the reservoir for pressure increase toward the master cylinder are provided parallel to each other in a flow passage leading from the main flow passage to the reservoir for pressure increase.

In this brake system, a module for antilock control may be provided for pressure increase and reduction control of the wheel cylinder pressure in response to a command from an electronic control unit provided between the hydraulic pressure limit/changeover means and the wheel cylinders. As the module for antilock control, it is preferable to use a mass-produced antilock control unit comprising a reservoir for pressure reduction for introducing fluid discharged from the wheel cylinders, and an electric pump for sucking brake fluid in the reservoir for pressure reduction and returning it into the main flow passage.

Also preferably, a differential pressure generating means comprising a differential pressure valve and an on-off valve arranged parallel to each other is provided in the main flow passage on its wheel cylinder side of the hydraulic pressure limit/changeover means, and the on-off valve of the differential pressure generating means is opened and closed to change over the differential pressure produced between the master cylinder and the wheel cylinders at least in two stages.

Further preferably, a flow passage for communicating a back-pressure chamber of the reservoir for pressure increase with a reservoir of the master cylinder and a pressure-responsive valve for opening and closing the flow passage are provided, the pressure-responsive valve is acted by hydraulic pressure in the back-pressure chamber of the reservoir for pressure increase in the valve-opening direction and by the hydraulic pressure on the wheel cylinder side in the valve-closing direction so as to open when the differential pressure produced between the master cylinder and the wheel cylinders is below a predetermined value, and close when the predetermined value is exceeded.

Since the reservoir for pressure increase is provided upstream (on the master cylinder side) of the hydraulic pressure limit/changeover means, the proportional pressure-reducing valve included in the hydraulic pressure limit/changeover means can be provided only for the purpose of replenishing brake fluid equivalent to fluid returned by piston back/retraction of the wheel cylinders. It may be one in which the split point hydraulic pressure is low and the pressure-reducing ratio is small or zero, and it is possible to make the hydraulic pressure at the start of regenerative braking unlimitedly close to zero.

Also, since the reservoir for pressure increase, which is also used as a stroke simulator, is provided upstream of the proportional pressure-reducing valve, so that brake fluid from the master cylinder flows directly into this reservoir, solid pedal feeling will not be felt even during sharp braking.

Further, if the brake pedal is returned during regenerative braking, since brake fluid in the reservoir for pressure increase returns through the check valve and to the master cylinder, remaining of fluid in the reservoir for pressure increase will not occur, so that no hitched feeling of the brake pedal will develop.

With the system using a mass-produced antilock control unit as the module for antilock control, although it is provided with two electric motor, using a mass-produced antilock control unit is inexpensive than using a single electric motor both for pressure increase during regenerative braking and pressure re-increase for antilock.

Also, with a system in which the differential pressure generating means is provided, it is possible to change braking force by hydraulic pressure in a stepwise manner. Braking force obtained by regenerative braking is, due to the characteristics of the motor, large in a low-speed region, and gradually decreases as the vehicle speed rises as shown in FIG. 7. Also, it decreases sharply from a certain point of time in which the vehicle speed approaches zero. Thus, it is preferable that between the braking from high speed and braking from low speed, the braking force by hydraulic pressure differs. With a system provided with a differential pressure generating means, it is possible to control so that the braking force by hydraulic pressure is large during braking from high speed and is small during braking from low speed. This permits braking close to ideal.

Also, if adjustment of the amount of brake fluid taken into the reservoir for pressure increase is carried out by controlling the on-off valve on the inlet side, a pressure sensor for detecting hydraulic pressure is needed. In contrast, with a system in which a circuit for bringing the back-pressure chamber of the reservoir for pressure increase into communication with the reservoir of the master cylinder is provided and a pressure-responsive valve is provided in this circuit, when a predetermined differential pressure is produced between the master cylinder and the wheel cylinders, the pressure-responsive valve closes and taking-in of fluid into the reservoir for pressure increase stops automatically. Thus, no pressure sensor is needed and control of the system is simplified.

Other features and objects of the present invention will become apparent from the following description made with reference to the accompanying drawings, in which:

DETAILED DESCRIPTION OF THE PREFERRED EMBODIMENT

Figure 1:
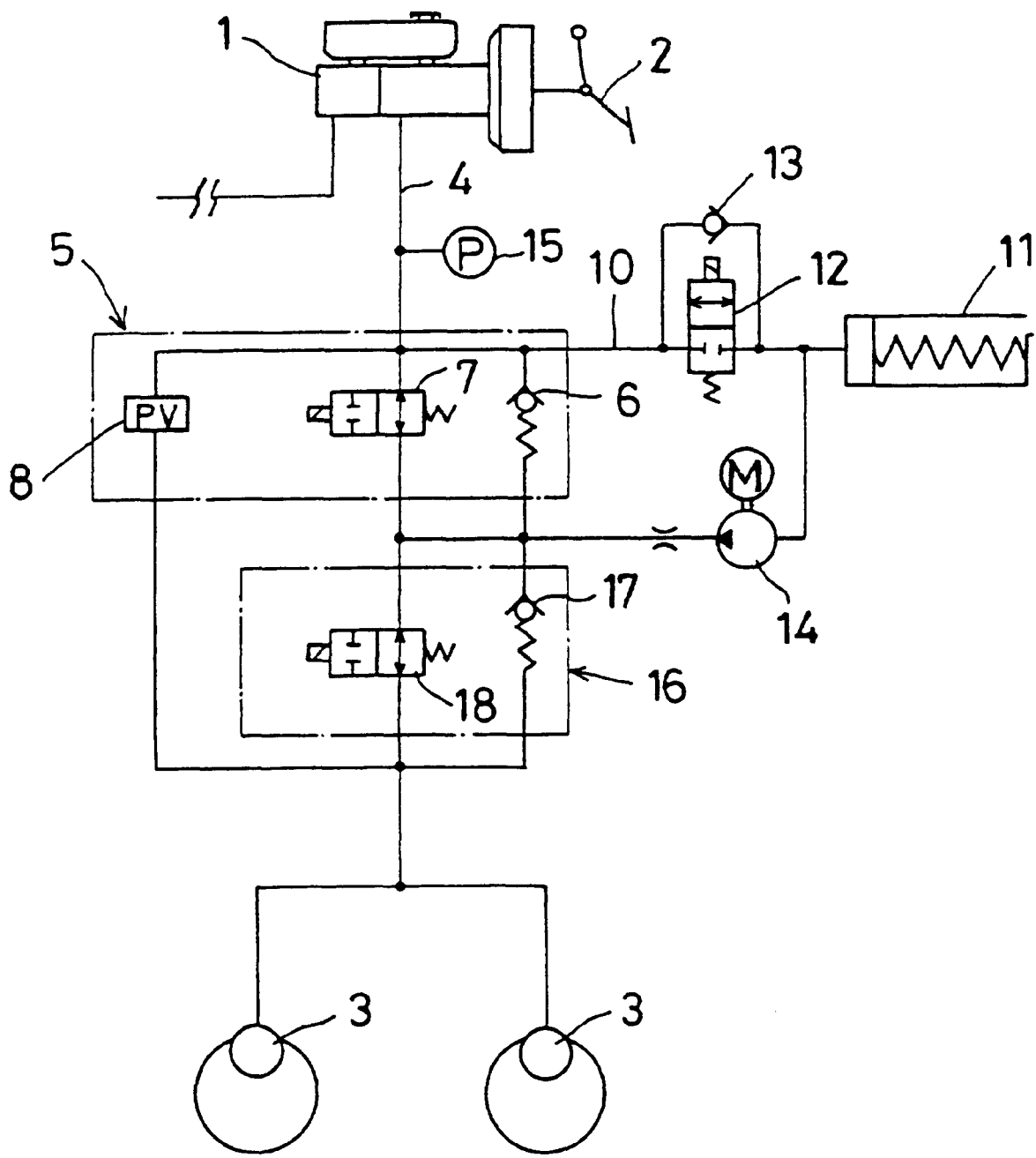
FIG. 1 is a circuit diagram of a brake system according to this invention in its basic form.

FIG. 1 shows a circuit diagram of a brake system according to this invention in its basic form. The system shown has two hydraulic lines. Since they have substantially the same structure, the circuit diagram shows only one line with the other line omitted.

In FIG. 1, a master cylinder 1 with a vacuum booster is provided at the upstream end, a brake pedal 2 is provided, and wheel cylinders 3 at the downstream end are connected to the master cylinder 1 through a main flow passage 4.

In the main flow passage 4, a hydraulic pressure limit/changeover means 5 is provided which is formed by arranging a differential pressure valve 6, a solenoid-operated on-off valve 7, and a proportional pressure-reducing valve 8 parallel to each other.

The differential pressure valve 6 opens when the hydraulic pressure difference between upstream and downstream exceeds a preset pressure (that is, working pressure). It is preferably a relief valve as illustrated because it is inexpensive.

The proportional pressure-reducing valve 8 may be a valve having the same structure as a known proportioning valve used for distribution of braking force to front and rear vehicle wheels. The valve 8 is provided to supply fluid from the master cylinder 1 toward the wheel cylinders 3 upon release of braking until brake fluid returned by piston back/retraction of the wheel cylinders is replenished. Its split point is set at an extremely low value. Its reduction ratio is also set at zero or a value near zero. Upon release of braking, brake fluid can also return through the proportional pressure-reducing valve 8.

A flow passage 10 branches from the main flow passage 4 at a point upstream of the hydraulic pressure limit/changeover means 5. A reservoir 11 for pressure increase is provided in the flow passage 10, and on the inlet side of the reservoir 11, a solenoid-operated on-off valve 12 and a check valve 13 permitting return of fluid from the reservoir 11 to the master cylinders 1 are provided in parallel.

An electric motor-driven pump 14 (hereinafter simply referred to as the pump) sucks brake fluid in the reservoir 11 and supplies it to the wheel cylinders 3 when a pressure-increase command is issued from an electronic control unit (not shown). Fluid sucked by the pump 14 is introduced into the main flow passage 4 at a point (downstream of the hydraulic pressure limit/changeover means 5.

Besides these elements, the illustrated system has a pressure sensor 15 and a differential pressure generating means 16. The latter is formed by arranging a differential pressure valve 17 and an on-off valve 18 parallel to each other, and is provided in the main flow passage 4 downstream of the introducing point of pump discharge pressure.

For the differential pressure valve 17, one similar to the differential pressure valve 6 is used, and for the on-off valve 18, one similar to the on-off valve 7 is used. The differential pressure generating means 16 further reduce the hydraulic pressure reduced by the differential pressure valve 6 by a predetermined pressure and supply it to the wheel cylinders 3.

FIG. 2 shows how the brake system of FIG. 1 works and the relation between the master cylinder pressure and the wheel cylinder pressure. Since the control of this kind of system is described in Japanese patent publication 11-198786 in detail, description here is only about essential points.

Figure 2B:
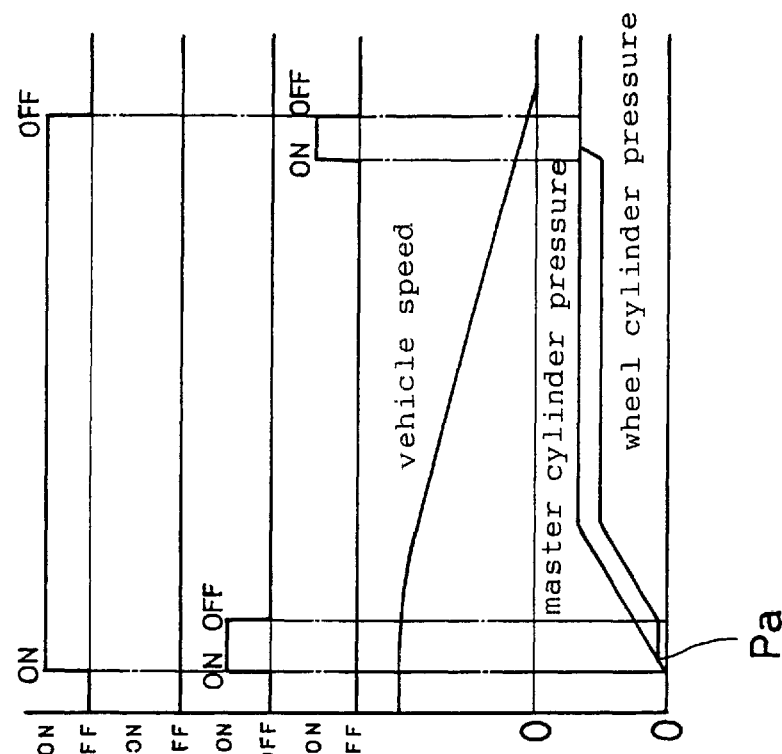
FIGS. 2A and 2B are views showing the actuation of the system and the relation between the master cylinder pressure and the wheel cylinder pressure.
Figure 2A:
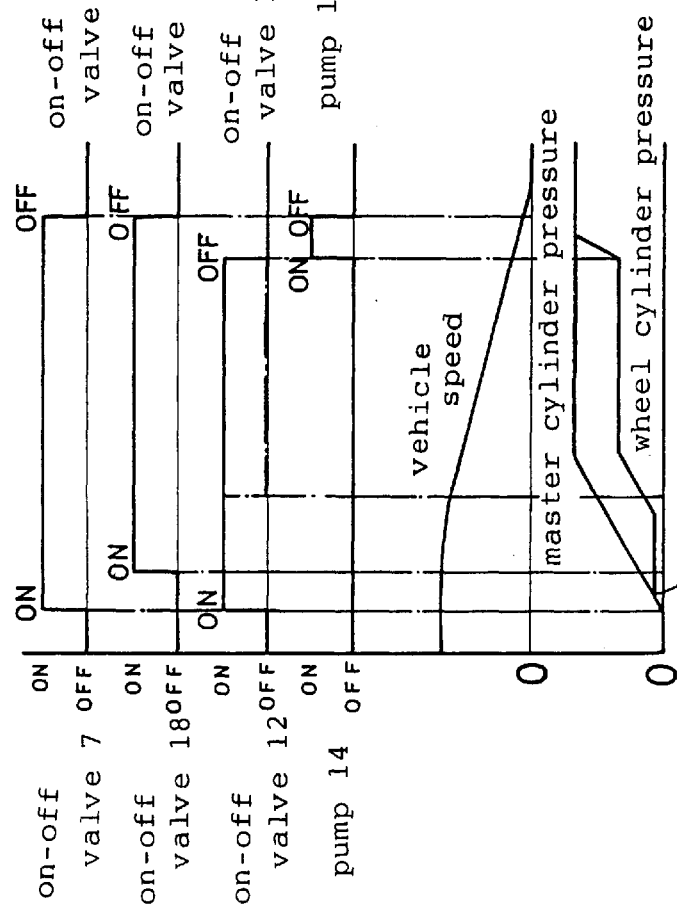

For braking from a low speed, as shown in FIG. 2A, the on-off valve 7 is closed and the on-off valve 12 is opened based on a brake operating signal (for which a lighting signal of the brake lamps may be used). At this time, the on-off valve 18 is still kept open.

In this situation, when an amount of fluid equal to the amount returned by piston back/retraction after the previous braking is replenished into the wheel cylinders 3 from the master cylinder 1 through the proportional pressure-reducing valve 8, the hydraulic pressure from the master cylinder 1 reaches the split point hydraulic pressure Pa of the proportional pressure-reducing valve 8, so that pressure reduction by the valve 8 begins. Thereafter, when the on-off valve 18 is closed before the supply pressure reaches the working pressure of the differential pressure valve 6, a differential pressure ΔP set by the differential pressure valves 6 and 17 is produced between the master cylinder 1 and the wheel cylinders 3 (if the working pressure of the differential pressure valves 6 and 17 are e.g. 5 bar, ΔP will be 10 bar). Thereafter, the differential pressure valves 6 and 17 will open, so that with the pressure rise in the master cylinder, the wheel cylinder pressure also rises while maintaining the pressure difference ΔP.

Introduction of fluid into the reservoir 11 for pressure increase is performed after the hydraulic pressure has exceeded the split point hydraulic pressure Pa of the proportional pressure-reducing valve 8 and before the differential pressure valves 6 and 17 open. If it has been clearly confirmed that the reservoir 11 for pressure increase has become full, the on-off valve 12 may be closed at an earlier timing as shown in FIG. 2A.

When the vehicle speed sufficiently drops and the vehicle is about to stop, since the regenerative braking force decreases gradually, fluid in the reservoir 11 for pressure increase is sucked up by the pump 14 and supplied to the wheel cylinders 3 to eliminate the differential pressure ΔP while making up for the reduction in the regenerative braking force by the braking force by hydraulic pressure, and when the regenerative braking force becomes zero, it is completely changed over to hydraulic pressure braking.

Next, at the time of braking from a high speed, as shown in FIG. 2B, the on-off valve 7 is closed and the on-off valve 12 is opened. The on-off valve 18 is kept open. In this way, a pressure difference determined by the working pressure-of the differential pressure valve 6 is produced between the master cylinder 1 and the wheel cylinders 3, so that the braking force by hydraulic pressure is larger compared with the force at the time of braking from a low speed.

In this case, the differential starting pressure of the differential pressure valve 6 is estimated, and the on-off valve 12 is closed when the hydraulic pressure detected by the pressure sensor 15 reaches the estimated differential starting pressure. If a lag in the timing increases, even after the differential pressure valve 6 has opened, fluid will be taken into the reservoir 11 for pressure increase, so that the pedal feel worsens. Thus, closing of the on-off valve 12 has to be carried out with optimum timing.

Also, immediately before stopping of the vehicle when regenerative braking ends, in the same manner as above, the wheel cylinder pressure is increased by fluid supplied from the pump to cancel the differential pressure between the wheel cylinder pressure and the master cylinder pressure.

In braking from high speed, since the regenerative braking force increases with the decrease of the vehicle speed, it is also possible to close the on-off valve 18 with the increase of the regenerative braking force to decrease the wheel cylinder pressure (i.e. braking force by hydraulic pressure) from halfway. Of course, this control is carried out on a command from the electronic control unit.

The system of FIG. 1 can set the differential pressure in two stages. But by increasing the number of the differential pressure generating means 16, it is possible to change over in three or more stages for finer control and increased performance. Since the cost is not ignorable, however, the differential pressure means are preferably provided by two or three sets at most.

Figure 3:
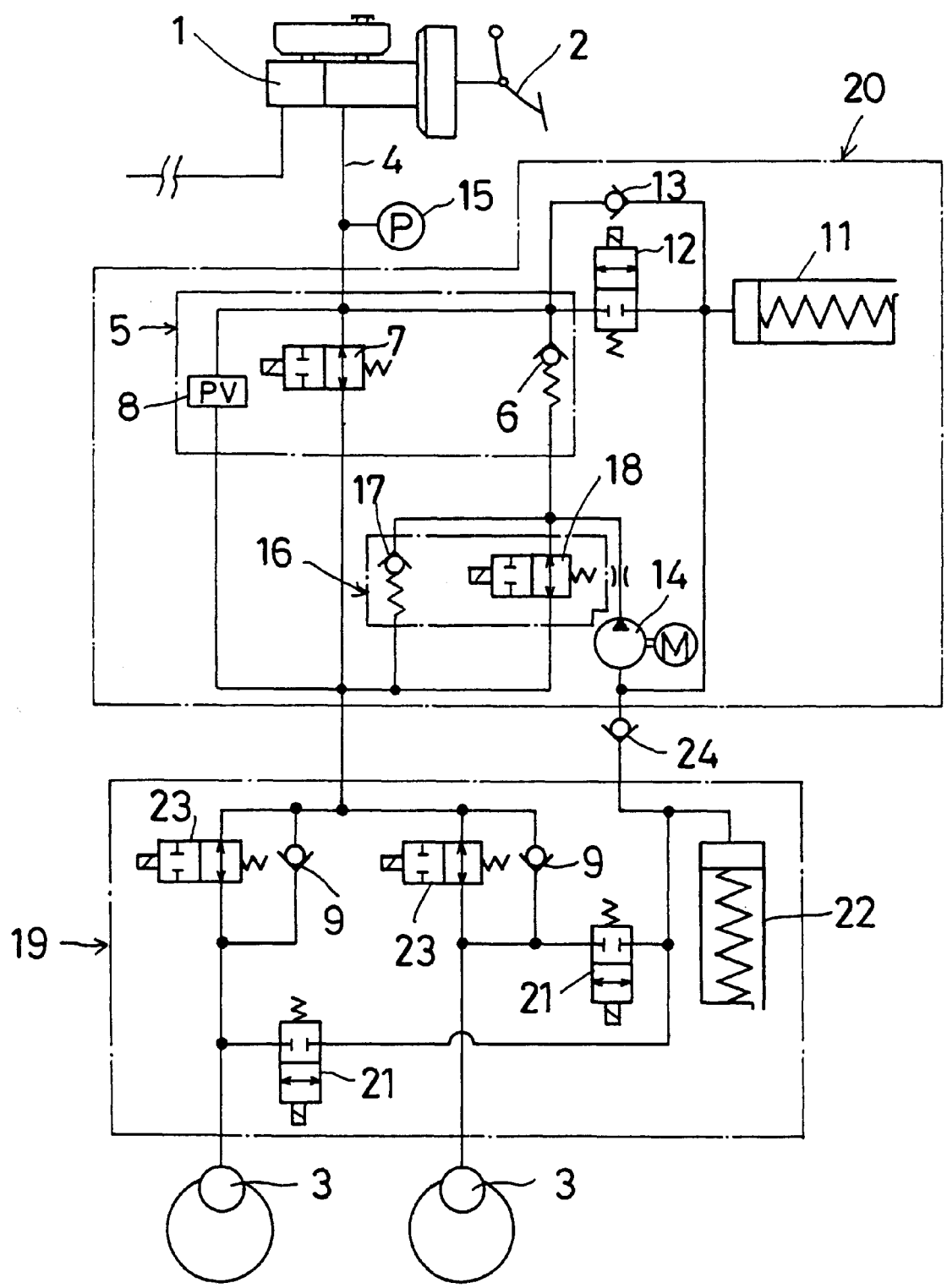
FIG. 3 is a circuit diagram of a brake system provided with a module for antilock control.

FIG. 3 is a brake system to which is added a module 19 for antilock control. Although a regenerative cooperative unit 20 used in this system slightly differs from the system of FIG. 1 in the manner of piping, it is substantially the same as the one of FIG. 1. Thus the same numerals are used to the same elements and their description is omitted.

With the module 19 for antilock control shown, the pump 14 is also used as a pump for antilock pressure re-increase. Besides the pump 14, it is provided with an on-off valve 21 for discharging brake fluid from the wheel cylinders 3, a reservoir 22 for pressure reduction for receiving fluid discharged from the wheel cylinders 3, an on-off valve 23 for stopping the supply of hydraulic pressure from the master cylinder 1 during antilock pressure reduction, and a check valve 9 arranged parallel to the on-off valve 23. Also, a check valve 24 that opens with a small differential pressure is provided in a flow passage leading from the reservoir 22 for pressure reduction to the inlet port of the pump 14. A passage from the reservoir 11 for pressure increase is connected to the passage between the check valve 24 and the pump 14.

The on-off valves 21, 23 are not limited to the type shown if they can perform antilock pressure reduction and pressure re-increase.

Figure 4:
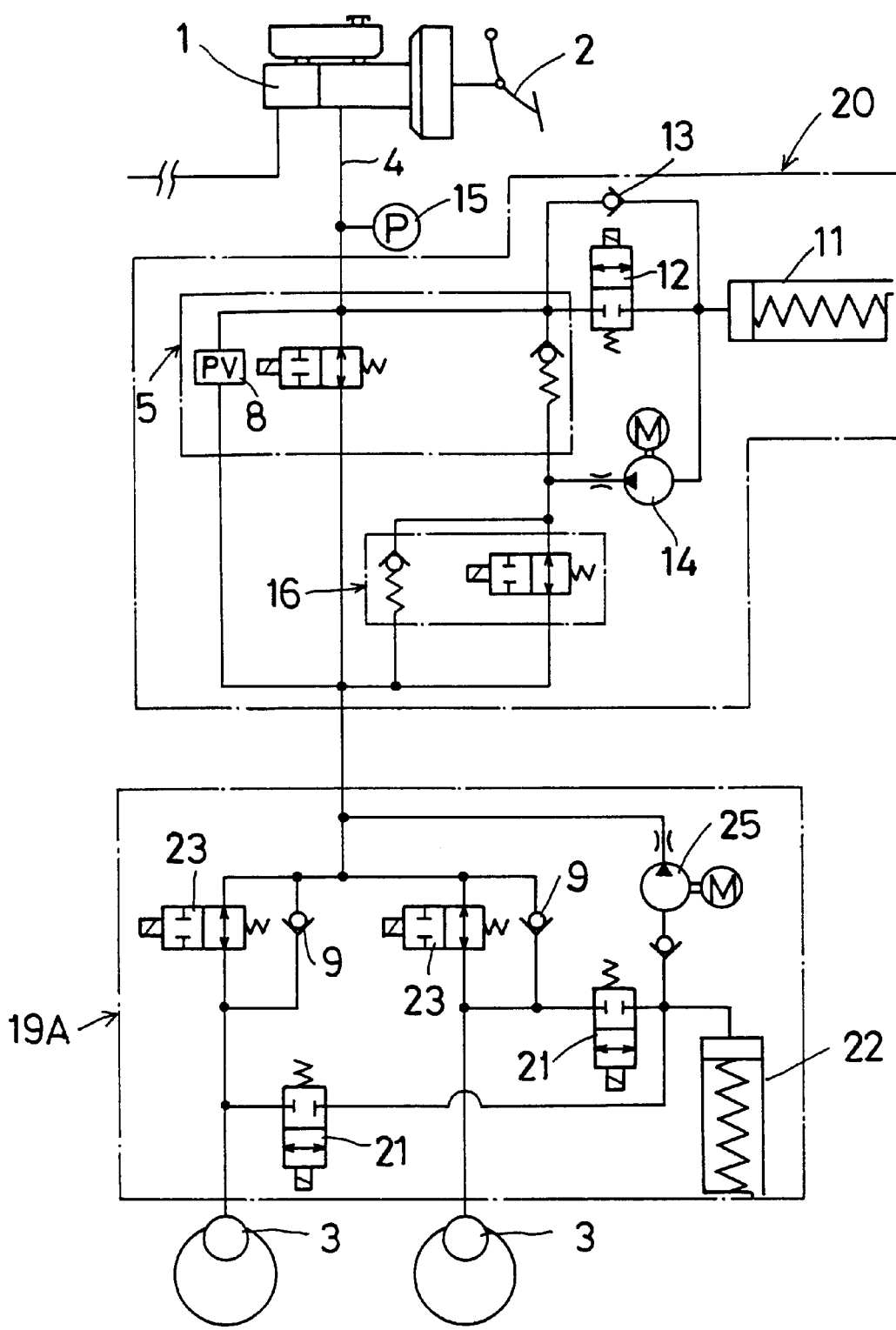
FIG. 4 is a circuit diagram of a brake system using a mass-produced antilock control unit.

FIG. 4 shows an arrangement in which as the module for antilock control, a mass-produced antilock control unit 19A is used. The unit 19A is provided with an electric pump 25 for sucking brake fluid from the reservoir 22 for pressure reduction and returning it to the main flow passage 4 when an antilock pressure re-increase command is issued from an electronic control unit (not shown). Thus, if the antilock control unit 19A is provided, at least two electric pumps are included in the same brake system. Also, many of recent antilock control units have an integrated electronic control unit. Thus, if such a unit is used, there can be two electronic control units, one for regenerative cooperation and one for antilock control. But compared with increase in cost due to increase in the elements; the effect of reduction in cost when a mass-produced antilock control unit is used is larger, and thus using such a unit is more economical. Also, piping is easier.

Figure 5:
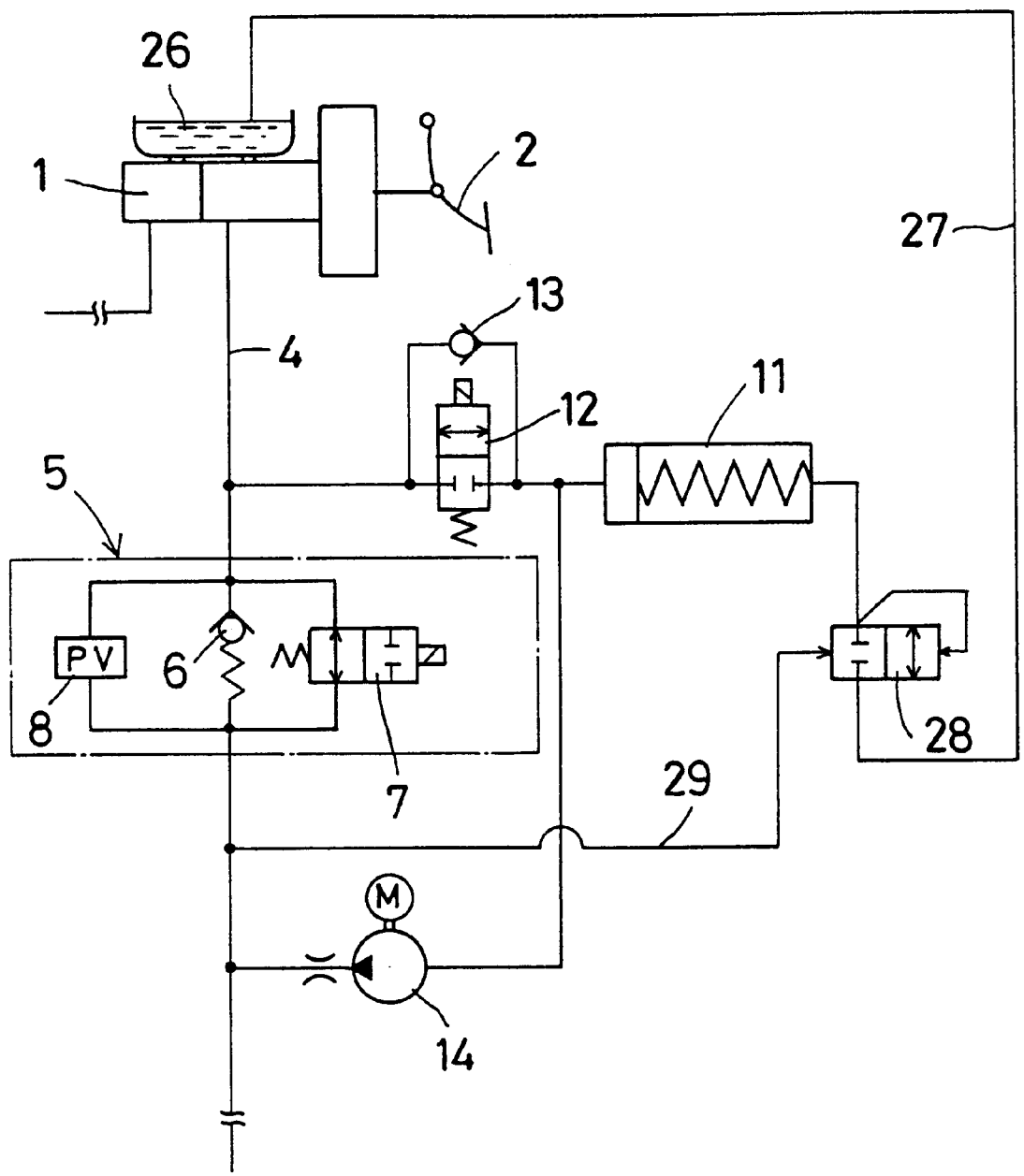
FIG. 5 is a circuit diagram showing a portion of a brake system provided with a pressure-responsive valve.

FIG. 5 shows another arrangement in which a flow passage 27 is provided through which the back-pressure chamber of the reservoir 11 for pressure increase communicates with the reservoir 26 of the master cylinder 1, and a pressure-responsive valve 28 is mounted in the flow passage 27. While the structure on the downstream side is not shown, it is the same as shown in FIGS. 1, 3 and 4.

With the brake system of FIG. 5, the hydraulic pressure in the back-pressure chamber of the reservoir 11 for pressure increase is applied to the pressure-responsive valve 28 in the valve-opening direction, while the hydraulic pressure downstream of the hydraulic pressure limit/changeover means 5 (that is, wheel cylinder pressure during ordinary braking) is applied to the pressure responsive valve 28 in the valve-closing direction by passing it through a flow passage 29. With this arrangement, if the working pressure of the differential pressure valve 6 is set at e.g. 5 bar, a fluid corresponding to the differential pressure of 5 bar is taken into the reservoir 11 for pressure increase.

That is to say, while pressure reduction by the proportional pressure-reducing valve 8 is being carried out, the valve-opening force by the hydraulic pressure in the back-pressure chamber overcomes the valve-closing force by the hydraulic pressure in the flow passage 29, so that the pressure responsive valve 28 will open and fluid be fed into the reservoir 11 for pressure increase. Also, when the differential pressure between the master cylinder pressure and the wheel cylinder pressure reaches 5 bar, the force relation between the valve-closing force and the valve-opening force is reversed, and at this moment the pressure-responsive valve 28 closes, so that taking-in of fluid stops automatically.

Figure 6:
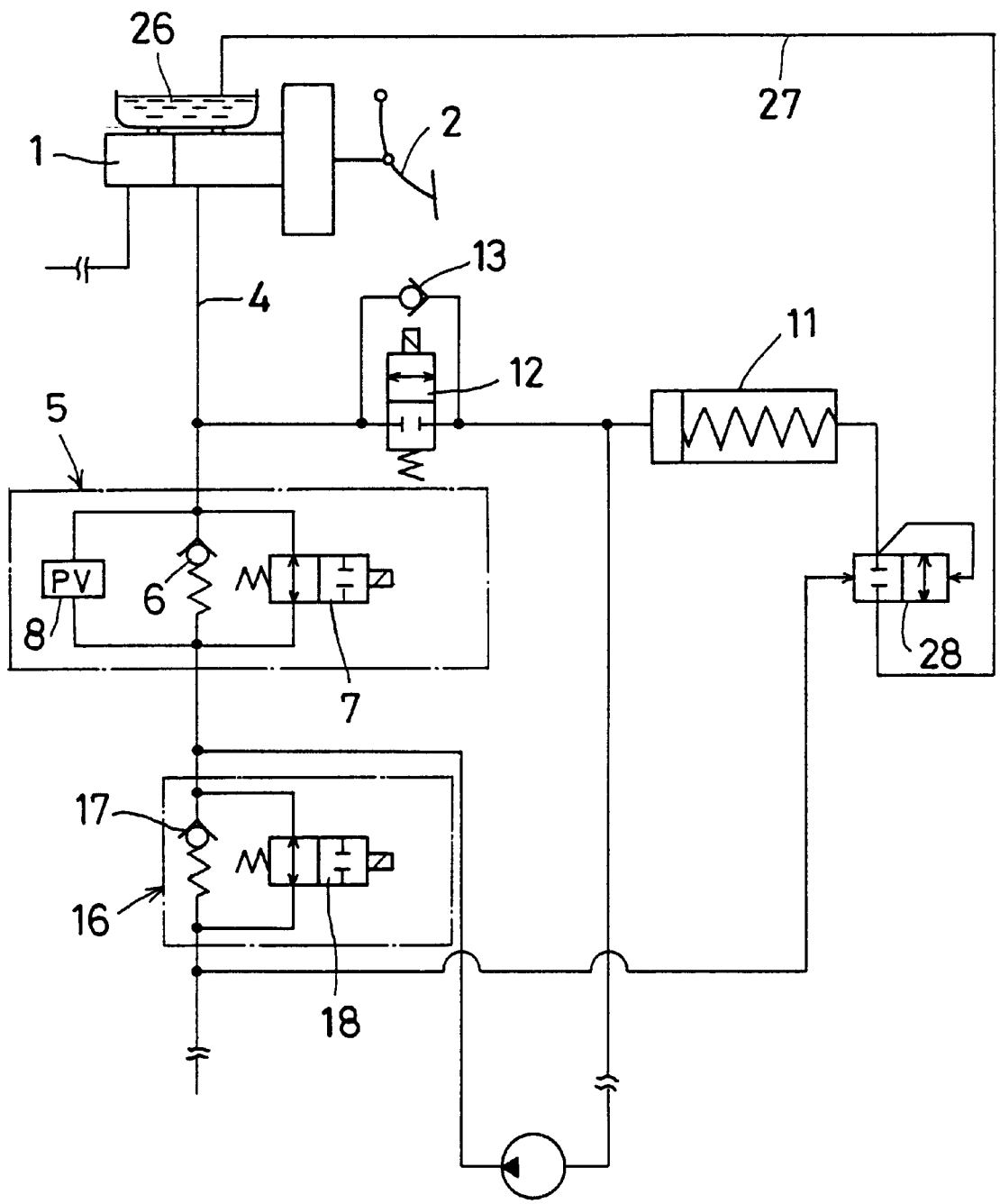
FIG. 6 is a circuit diagram of a brake system in which a differential pressure generating means is added to the system of FIG. 5.
Figure 7:
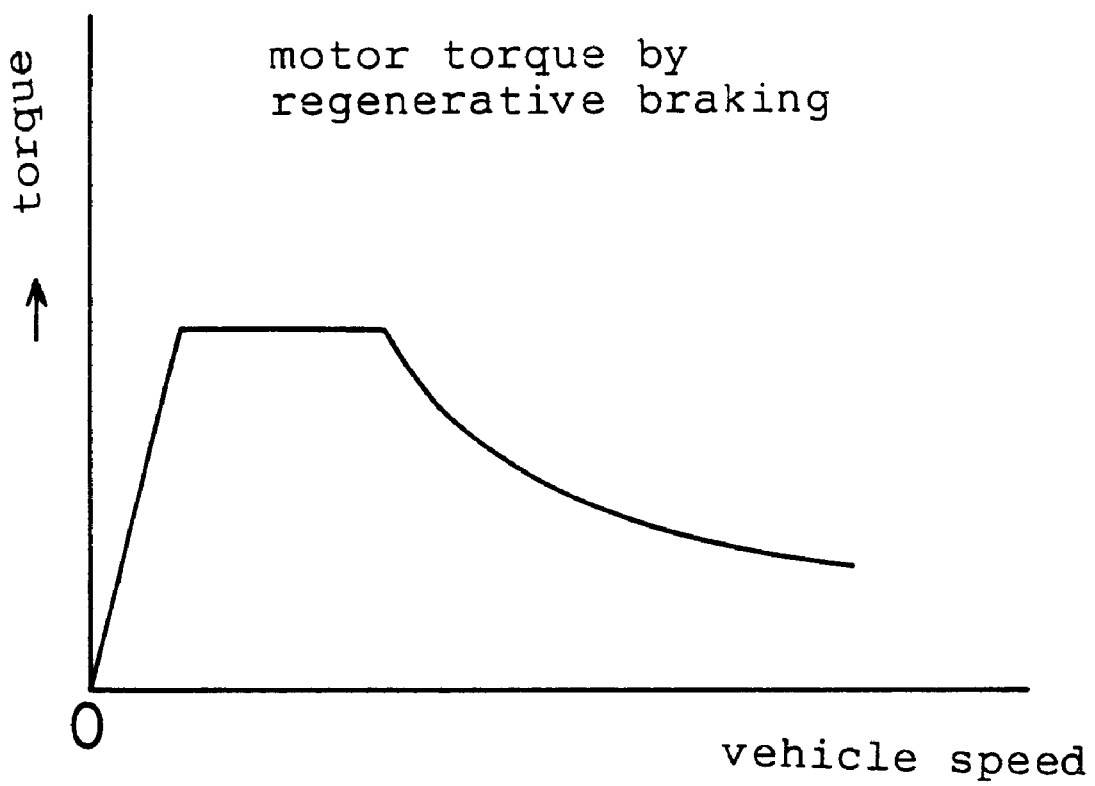
FIG. 7 is a graph showing the relation between the braking force by regenerative braking and the vehicle speed.

FIG. 6 shows an arrangement in which the differential pressure generating means 16 shown in FIG. 1 is added to the brake system of FIG. 5. In the system of FIG. 6, since the differential pressure between the master cylinder pressure and the wheel cylinder pressure is changed over in two stages, it is necessary to stop taking-in of fluid at positions corresponding to the respective differential pressures. Otherwise, the reservoir 11 may become full and taking-in of fluid may stop before the preset differential pressure is produced, or taking-in of fluid may continue even after the preset differential pressure has been produced. This worsens pedal feeling. Taking-in of fluid can also be stopped by controlling the on-off valve 12. But if this is done using the pressure-responsive valve 28 as in FIGS. 5 and 6, it is possible to omit a pressure sensor, which is indispensable when this is done by controlling the on-off valve 12. Thus this is advantageous from the viewpoints of cost and control.

As described above, in the brake system according to this invention, since a reservoir for pressure increase is provided upstream of the hydraulic pressure limit/changeover means, it is possible to make the hydraulic pressure at the start of regenerative braking unlimitedly close t,o zero to thereby quicken the start of regenerative braking (that is, energy recovery timing) and to optimize the braking force by hydraulic pressure at the initial period of start, thereby reducing the consumption of energy.

Also, because brake fluid flows from the master cylinder into the reservoir for pressure increase, which also serves as a stroke simulator, solid pedal feeling during sharp braking will disappear.

Further, since return of fluid from the reservoir for pressure increase to the master cylinder is done with low resistance, remaining of fluid in the reservoir will not occur, so that hitched feeling of the brake pedal will disappear.

Besides, with a brake system in which the differential pressure generating means is provided, it is possible to change over the differential pressure produced between the master cylinder and the wheel cylinders in a stepwise manner to bring the braking force by hydraulic pressure to a required value. Thus it is possible to reduce the energy consumption.

Also, with a brake system in which taking-in of fluid into the reservoir for pressure increase is stopped by a pressure-responsive valve, a pressure sensor can be omitted. Thus it is possible to reduce the cost and simplify control.

What is claimed is:

1. A brake system, for an electric vehicle which uses both regenerative braking in which braking force is applied to wheels by an electric motor for driving wheels, and hydraulic braking in which braking force is applied to the wheels by supplying hydraulic pressure of a master cylinder to wheel cylinders, and during said regenerative braking, a predetermined differential pressure is produced between said master cylinder and said wheel cylinders by lowering hydraulic pressure supplied from said master cylinder to-said wheel cylinders by means of a hydraulic pressure limit/changeover means comprising a differential pressure valve, an on-off valve and a proportional pressure-reducing valve provided parallel to said differential pressure valve, and at the end of regenerative braking, said differential pressure being cancelled by sucking brake fluid from a reservoir for pressure increase, which serves also as a stroke simulator, by means of an electric pump and supplying it to the wheel cylinder-s in response to a pressure-increase command from an electronic control unit, characterized in that said reservoir for pressure increase communicates with a main flow passage at a point upstream of said hydraulic pressure limit/changeover means, and an on-off valve and a check valve for allowing only a fluid flow from said reservoir for pressure increase toward said master cylinder are provided parallel to each other in a flow passage leading from said main flow passage to said reservoir for pressure increase.

2. The brake system for an electric vehicle as claimed in claim 1 wherein a module for antilock control for increase and reduction control of the wheel cylinder pressure in response to a command from an electronic control unit is provided between said hydraulic pressure limit/changeover means and said wheel cylinders.

3. The brake system for an electric vehicle as claimed in claim 2 wherein as said module for antilock control, a mass-produced antilock control unit is used which comprises a reservoir for pressure reduction for introducing fluid discharged from said wheel cylinders, and a second electric pump for sucking brake fluid in said reservoir for pressure reduction and returning it into said main flow passage.

4. The brake system for an electric vehicle as claimed in claim 3 wherein a differential pressure generating means comprising a differential pressure valve and an on-off valve arranged parallel to each other is provided in said main flow passage downstream of said hydraulic pressure limit/changeover means, and said on-off valve of said differential pressure generating means is opened and closed to change over the differential pressure produced between said master cylinder and said wheel cylinders at least in two stages.

5. The brake system for an electric vehicle as claimed in claim 3 wherein a flow passage for communicating a back-pressure chamber of said reservoir for pressure increase with a reservoir of said master cylinder and a pressure-responsive valve for opening and closing said flow passage are provided, said pressure-responsive valve being acted by hydraulic pressure in said back-pressure chamber of said reservoir for pressure increase in the valve-opening direction and by the hydraulic pressure on the wheel cylinder side in the valve-closing direction so as to open when the differential pressure produced between the master cylinder and said wheel cylinders is below a predetermined value, and close when said predetermined value is exceeded.

6. The brake system for an electric vehicle as claimed in claim 2 wherein a differential pressure generating means comprising a differential pressure valve and an on-off valve arranged parallel to each other is provided in said main flow passage downstream of said hydraulic pressure limit/changeover means, and said on-off valve of said differential pressure generating means is opened and closed to change over the differential pressure produced between said master cylinder and said wheels cylinders at least in two stages.

7. The brake system for an electric vehicle as claimed in claim 2 wherein a flow passage for communicating a back-pressure chamber of said reservoir for pressure increase with a reservoir of said master cylinder and a pressure-responsive valve for opening and closing said flow passage are provided, said pressure-responsive valve being acted by hydraulic pressure in said back-pressure chamber of said reservoir for pressure increase in the valve-opening direction and by the hydraulic pressure on the wheel cylinder side in the valve-closing direction so as to open when the differential pressure produced between the master cylinder and said wheel cylinders is below a predetermined value, and close when said predetermined value is exceeded.

8. The brake system for an electric vehicle as claimed in claim 1 wherein a differential pressure generating means comprising a differential pressure valve and an on-off valve arranged parallel to each other is provided in said main flow passage downstream of said hydraulic pressure limit/changeover means, and said on-off valve of said differential pressure generating means is opened and closed to change over the differential pressure produced between said master cylinder and said wheel cylinders at least in two stages.

9. The brake system for an electric vehicle as claimed in claim 8 wherein a flow passage for communicating a back-pressure chamber of said reservoir for pressure increase with a reservoir of said master cylinder and a pressure-responsive valve for opening and closing said flow passage are provided, said pressure-responsive valve being acted by hydraulic pressure in said back-pressure chamber of said reservoir. for pressure increase in the valve-opening direction and by the hydraulic pressure on the wheel cylinder side in the valve-closing direction so as to open when the differential pressure produced between the master cylinder and said wheel cylinders is below a predetermined value, and close when said predetermined value is exceeded.

10. The brake system for an electric vehicle as claimed in claim 1 wherein a flow passage for communicating a back-pressure chamber of said reservoir for pressure increase with a reservoir of said master cylinder and a pressure-responsive valve for opening and closing said flow passage are provided, said pressure-responsive valve being acted by hydraulic pressure in said back-pressure chamber of said reservoir for pressure increase in the valve-opening direction and by the hydraulic pressure on the wheel cylinder side in the valve-closing direction so as to open when the differential pressure produced between the master cylinder and said wheel cylinders is below a predetermined value, and close when said predetermined value is exceeded.

11. A brake system for an electric vehicle which uses both (regenerative braking, in which braking force is applied to wheels by an electric motor for driving wheels, and hydraulic braking, in which braking force is applied to the wheels by supplying hydraulic pressure of a master cylinder to wheel cylinders, and during said regenerative braking, a predetermined differential pressure is produced between said master cylinder and said wheel cylinders by lowering hydraulic pressure supplied from said master cylinder to said wheel cylinders by use of a hydraulic pressure limit/changeover mechanism that comprises a differential pressure valve, an on-off valve and a proportional pressure-reducing valve provided parallel to said differential pressure valve, and at the end of regenerative braking, said differential pressure being cancelled by sucking brake fluid from a reservoir for pressure increase, which serves also as a stroke simulator, by use of an electric pump and supplying the brake fluid to the wheel cylinders in response to a pressure-increase command from an electronic control unit, wherein said reservoir for pressure increase communicates with a main flow passage at a point upstream. of said hydraulic pressure limit/changeover mechanism, and an on-off valve and a check valve that allows only a fluid flow from said reservoir for pressure increase toward said master cylinder are provided parallel to each other in a flow passage leading from said main flow passage to said reservoir for pressure increase.

12. The brake system for an electric vehicle as claimed in claim 11 wherein an antilock control module for increase and reduction control of the wheel cylinder pressure in response to a command from an electronic control unit is provided between said hydraulic pressure limit/changeover mechanism and said wheel cylinders.

13. The brake system for an electric vehicle as claimed in claim 12 wherein as said antilock control module, a mass-produced antilock control unit is used which comprises a pressure reduction reservoir introduces fluid discharged from said wheel cylinders, and a second electric pump for sucking brake fluid in said reservoir for pressure reduction and returning the brake fluid into said main flow passage.

14. The brake system for an electric vehicle as claimed in claim 13 wherein a differential pressure generator that comprises a differential pressure valve and an on-off valve arranged parallel to each other is provided in said main flow passage downstream of said hydraulic pressure limit/changeover mechanism, and said on-off valve of said differential pressure generator is opened and closed to change over the differential pressure produced between said master cylinder and said wheel cylinders at least in two stages.

15. The brake system for an electric vehicle as claimed in claim 13 wherein a flow passage for communicating a back-pressure chamber of said reservoir for pressure increase with a reservoir of said master cylinder and a pressure-responsive valve for opening and closing said flow passage are provided, said pressure-responsive valve being actuated by hydraulic pressure in said back-pressure chamber of said reservoir for pressure increase in the valve-opening direction and by the hydraulic pressure on the wheel cylinder side in the valve-closing direction so as to open when the differential pressure produced between the masters cylinder and said wheel cylinders is below a predetermined value, and to close when said predetermined value is exceeded.

16. The brake system for an electric vehicle as claimed in claim 12 wherein a differential pressure generator that comprises a differential pressure valve and an on-off valve arranged parallel to each other is provided in said main flow passage downstream of said hydraulic pressure limit/changeover mechanism, and said on-off valve of said differential pressure generator is opened and closed to change over the differential pressure produced between said master cylinder and said wheel cylinders at least in two stages.

17. The brake system for an electric vehicle as claimed in claim 12 wherein a flow passage for communicating a back-pressure chamber of said reservoir for pressure increase with a reservoir of said master cylinder and a pressure-responsive valve for opening and closing said flow passage are provided, said pressure-responsive valve being actuated by hydraulic pressure in said back-pressure chamber of said reservoir for pressure increase in the valve-opening direction and by the hydraulic pressure on the wheel cylinder side in the valve-closing direction so as to open when the differential pressure produced between the master cylinder and said wheel cylinders is below a predetermined value, and to close when said predetermined value is exceeded.

18. The brake system for an electric vehicle as claimed in claim 11 wherein a differential pressure generator that comprises a differential pressure valve and an on-off valve arranged parallel to each other is provided in said main flow passage downstream of said hydraulic pressure limit/changeover, mechanism, and said on-off valve of said differential pressure generator is opened and closed to change over the differential, pressure produced between said master cylinder and said wheel cylinders at least in two stages.

19. The brake system for an electric vehicle as claimed in claim 18 wherein a flow passage for communicating a back-pressure chamber of said reservoir for pressure increase with a reservoir of said-master cylinder and a pressure-responsive valve for opening and closing said flow passage are provided, said pressure-responsive valve being actuated by hydraulic pressure in said back-pressure chamber of said reservoir for pressure increase in the valve-opening direction and by the hydraulic pressure on the wheel cylinder side in the valve-closing direction so as to open when the differential pressure produced between the master cylinder and said wheel cylinders is below a predetermined value, and to close when said predetermined value is exceeded.

20. The brake system for an electric vehicle as claimed in claim 11 wherein a flow passage for communicating a back-pressure chamber of said reservoir for pressure increase with a reservoir of said master cylinder and a pressure-responsive valve for opening and closing said flow passage are provided, said pressure-responsive valve being actuated by hydraulic pressure in said back-pressure chamber of said reservoir for pressure increase in the valve-opening direction and by the hydraulic pressure on the wheel cylinder side in the valve-closing direction so as to open when the differential pressure produced between the master cylinder and said wheel cylinders is below a predetermined value, and to close when said predetermined value is exceeded.

* * * * *

UNITED STATES PATENT AND TRADEMARK OFFICE
CERTIFICATE OF CORRECTION

PATENT NO. : 6,494,547 B2
DATED : December 17, 2002
INVENTOR(S) : H. Higashimura et al.

It is certified that error appears in the above-identified patent and that said Letters Patent is hereby corrected as shown below:

Column 8,
Line 30, "cylinder-s" should be -- cylinders --.

Column 9,
Line 16, "wheels" should be -- wheel --.
Line 66, before "regenerative" delete "( ".

Column 10,
Line 18, after "upstream" delete ".".

Column 11,
Line 22, after "changeover" delete ",".

Signed and Sealed this

Twelfth Day of August, 2003

JAMES E. ROGAN
*Director of the United States Patent and Trademark Office*